United States Patent [19]

Seo et al.

[11] 4,020,246
[45] Apr. 26, 1977

[54] LOW TEMPERATURE PRIMARY ELECTROLYTE CELL

[75] Inventors: Eddie T. Seo, Torrance; Herbert P. Silverman, Orange; Robert J. Day, Manhattan Beach, all of Calif.

[73] Assignee: TRW Inc., Redondo Beach, Calif.

[22] Filed: Jan. 21, 1976

[21] Appl. No.: 651,013

Related U.S. Application Data

[63] Continuation-in-part of Ser. No. 448,158, March 4, 1974, abandoned.

[52] U.S. Cl. .............................. 429/104; 429/105; 429/194
[51] Int. Cl.² ........................................ H01M 6/14
[58] Field of Search .......... 136/6 FS, 6 F, 20, 83 R, 136/100 R, 107, 137, 153, 86 A, 86 F; 429/104, 105, 194

[56] References Cited

UNITED STATES PATENTS

| 3,463,670 | 8/1969 | Rao et al. ................... 136/83 R |
| 3,773,558 | 11/1973 | Charbonnier et al. .......... 136/6 LN |
| 3,874,929 | 4/1975 | Greatbatch ...................... 136/83 R |

Primary Examiner—Anthony Skapars
Attorney, Agent, or Firm—John J. Connors; Donald R. Nyhagen; Edwin A. Oser

[57] ABSTRACT

A cell is fabricated using a solid alkali metal anode and a fluid cathode which are separated by a modified aluminate solid barrier which permits the flow of only the alkali metal ions. The fluid cathode can contain a solid, gaseous, or liquid oxidizer in a liquid electrolyte. Operating temperatures for these cells range from less than −40° C to approximately 95° C. At ambient temperatures, energy densities of the cells range from approximately 0.7 to 1.8 watt-hour per cubic centimeter. These cells are electrically rechargeable by raising their temperature above the melting point of sodium.

10 Claims, 3 Drawing Figures

LOW TEMPERATURE PRIMARY ELECTROLYTE CELL

This invention is a continuation-in-part of application Ser. No. 448,158, filed Mar. 4, 1974, now abandoned.

BACKGROUND OF THE INVENTION

Solid electrolyte batteries having a molten alkali metal are known in the art. U.S. Pat. No. 2,631,180 by Robinson teaches a primary cell in which the alkali metal anode is enclosed in a sealed glass envelope. The glass envelope acts as a barrier electrolyte, however, relatively high resistance of the glass permits only small currents to be delivered by the cell.

U.S. Pat. No. 3,404,035 by Kummer et al discloses a secondary battery which uses a β-alumina electrolyte with a sulfur cathode and a sodium anode. The battery is operated in a temperature range of about 200° C to about 600° C to maintain the anode and cathode in a molten state. Other patents to Kummer et al using similar arrangements are U.S. Pat. Nos. 3,404,036 and 3,413,150.

U.S. Pat. No. 3,773,558 by Charbonnier et al teaches a primary cell which uses a β-alumina electrolyte with a transition metal fluoride cathode and an anode of alkali or alkaline-earth metal alloy in liquid phase. The anode is comprised of at least two metals having a solid/liquid boundary at a relatively low operating temperature not more than about 100° C.

SUMMARY OF THE INVENTION

The present invention relates to a cell which employs a solid β-alumina electrolyte together with a solid alkali metal anode and a fluid oxidizer cathode. The cathodic oxidizer may be an oxidizing gas dissolved in an organic solvent, or it may be a liquid organic electrolyte solution of an inorganic salt or a metal no higher in the electromotive series than the alkali metal being used for the anode, or it may be a liquid organic electrolyte solution of an organic oxidizer.

These cells exhibit voltages in the range of 2.5 to 3.5 volts, depending upon choice of reactants. Thus, the cells provide a relatively cheap source of electrical power which may be used for small electronic devices, such as electronic watches, heart pacemakers, C-MOS circuits, and other similar devices.

DESCRIPTION OF THE PREFERRED EMBODIMENTS

In cells using a solid alkali metal anode, the ceramic electrolyte must be specifically modified by incorporating ions or atoms of alkali metals in the ceramic matrix which are identical to the alkali metal which will migrate through the electrolyte as ions. That is, if the cell is designed to have a sodium metal anode, then the ceramic matrix must include sodium atoms or ions in the aluminate ceramic matrix. Ceramics which are found to be most suitable for the applications of this invention are designated in the art of β-alumina. Methods for making β-alumina and other ionic conducting formulation of sodium aluminates are disclosed in the prior art, e.g. U.S. Pat. No. 3,468,719.

Although the theory is not clearly understood as to the operation of β-alumina solid electrolytes, it is believed that the ions from the alkali metal migrate through the β-alumina barrier and react with the cathodic oxidizer to produce a salt of the alkali metal and the oxidizer, giving up an electron in the process. The following equation is illustrative of the reaction in which sodium is used for the example:

The β-alumina barrier should be as thin as possible and still maintain structural integrity. This is because the internal resistance of the battery is proportional to the thickness of the barrier material, i.e. the greater the distance the alkali metal ions have to migrate, the greater the internal resistance to the battery. Thus, depending upon the formulation of ceramics, cells which do not have a pressure differential between the anode chamber and the cathode chamber may be fabricated as thin as engineering techniques will allow, usually between 0.01 centimeter and 0.1 centimeter. On the other hand, if the pressure differential exists between the cathode chamber and the anode chamber, as for example where the cathode material is a gas under pressure, the β-alumina electrolyte must be of sufficient thickness to maintain its structural integrity. While the gas pressure in the cathode chamber is not a major concern because the alkali metal in the anode chamber is solid, thus providing reinforcement for the electrolyte wall in most circumstances, attention is drawn to the avoidance of excessive gaseous pressures which could result in the failure of the fragile electrolyte wall.

Figure 1:
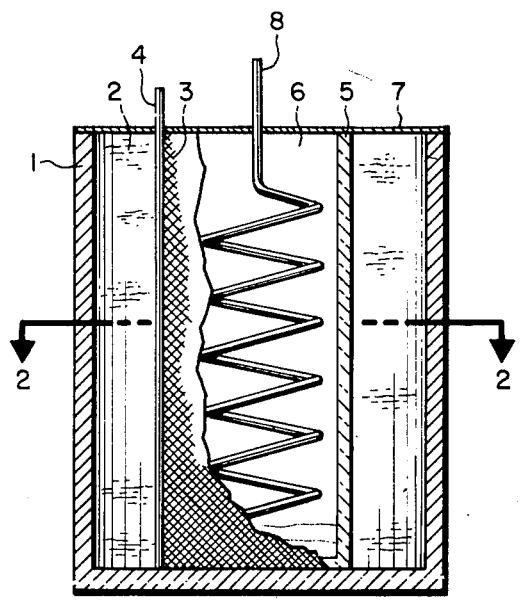
FIG. 1 is a side elevation of one embodiment of a cell according to this invention with parts broken away to show the anode and cathode electrodes and the β-alumina electrolyte separator.

Referring to the drawings, FIG. 1 shows a cell having a casing 1 which is made from a dielectric material having reasonable structural strength, e.g. glass, plastic, ceramic, or any of a number structural metals such as aluminum, iron, copper, and alloys. Cathodic reactant 2 is situated in the outer chamber of the cell and is in intimate contact with current collector surface 3. Current collector 3 may have any of a number of forms including a wire mesh, a coated surface, of a plated surface and may be selected from any of several materials, e.g. carbon, stainless stell, nickel, mercury, gold, of platinum. Current collector 3 is brought into contact with conductor 4 provide an exterior cathodic contact. Current collector 3 should be in intimate contact with β-alumina electrolyte 5 in order to reduce the internal resistance of the cell. If current collector 3 is carbon or platinum, then the cathode current collector 3 can be deposited on the outer surface of electrolyte 5.

Alkali metal anode 6 occupies the central chamber of the cell and is contained by β-alumina electrolyte 5 and β-alumina seal 7 which is impervious to the flow of alkali metal ions. Conductor 8 provides means to transmit the current from the anode chamber to an external contact. Power will be supplied by the primary cell upon completion of a circuit from the anode electrode conductor 8 to the cathode electrode conductor 4.

Figure 2:
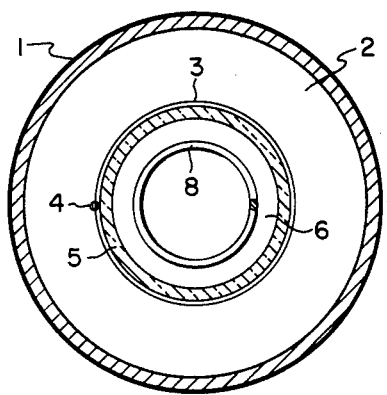
FIG. 2 is a sectional view of the cell of FIG. 1 taken along line 2—2.

FIG. 2 shows a sectional view of the cell in FIG. 1 along lines 2—2. It should be noted that the figures in the drawing illustrate only one possible embodiment, and numerous variations of the physical configuration may be possible within the scope of the present invention.

Sodium is the preferred metal anode reactant for the purposes of this invention. Various other metal ions will move through $\beta$-alumina solid electrolyte barrier, however, sodium is the preferred choice because greater power outputs per pound of material have been achieved with sodium than with other metals.

Fluid cathodic oxidizer reactants may be selected from any of several liquid or gaseous materials. Liquid cathodic reactants may be selected from liquid inorganic and organic oxidizers or a liquid solution of an inorganic or an organic oxidizer.

Gases such as air, oxygen, chlorine, iodine, fluorine, bromine, nitrogen oxides, ozone, to name a few, also may be used as the cathodic reactant. When gaseous reactants are used, current collectors are necessary. Platinum is the preferred of the current collectors materials, however, carbon, stainless steel, nickel, mercury or gold may be used, also. Gas pressures of reasonable amount may be used. Limiting factors to consider are pressures sufficiently high to provide the cell with reasonable life, and pressures low enough that the pressure differential between the anode chamber and the cathode chamber will not overstress the $\beta$-alumina barrier causing cracks or fissures. The danger of high pressure cracking the $\beta$-alumina barrier is minimized by the fact that the anode comprises a solid alkali metal material. However, care should be taken to avoid overstressing the fragile $\beta$-alumina barrier.

Where the cathode employs an organic solvent, generally, any polar aprotic organic solvent will be suitable. Specific examples of polar organic solvents which are illustrative of, but not limited to the following compounds acetonitrile, dimethylsulfoxide, propylene carbonate, or dimethylformamide. Generally, polar solvents provide a suitable solvent medium for large number of inorganic compounds. Although there are many other polar organic solvents other than the few examples given, the chief criteria for the solvent is that the inorganic compound dissolves therein.

Liquid organic oxidizers may be selected from solutions of tetracyanoethylene (TCNE), quinones, nitrobenzenes, tetracyanoquinodimethan (TCNQ), phenazinium salts, to name a few. The invention will be more clearly understood by referring to the following examples. These examples illustrate specific embodiments and should not be construed as limiting the invention.

EXAMPLE I

Approximately 0.3 mole of tetracyanoethylene dissolves in 2.8 grams of 0.5 molal solution of sodium hexafluoroarsenate in propylene carbonate, were placed into a clean, dry, cylindrical glass vessel. A cylindrical cup made of $\beta$-alumina was filled with sodium and placed in an oven. The sodium filled cup was heated above 300° until the electrical resistance drops substantially. The cup is removed from the oven, and the liquid sodium is poured out of the cup. The $\beta$-alumina cup is placed in a furnace and fired at 800° C for at least one hour. The cup is removed then and cooled in a protective atmosphere of helium, nitrogen, or argon. Next, platinum gauze with a wire conductor soldered thereto was immersed in the organic liquid in the glass vessel. A cylindrical cup of $\beta$-alumina having an outside diameter slightly less than the inside diameter of the platinum gauze was placed in the center of the platinum gauze cylinder. A nickel wire conductor was immersed in the sodium and extended above the top of the cylindrical glass vessel. The cylindrical glass vessel was sealed with epoxy resin.

The following tables provide a comparison of power and energy outputs of the cell of this example with prior art mercury and silver oxide cells.

TABLE I

| Type of Cell | Hg[1] | AgO[2] | Na/TCNE[3] |
|---|---|---|---|
| Open Circuit Voltage, V | 1.40 | 1.60 | 3.20 |
| Nominal Operating Voltage, V | 1.32 | 1.50 | 3.00 |
| Total Capacity, ma-h | 1.60 | 165 | 57.7 |
| Output Power, $\mu$w | 30 | 30 | 30 |
| Specific Power, $\mu$w/g | 15.1 | 11.7 | 28.8 |
| Power Density, $\mu$w/cm$^3$ | 59.5 | 59.5 | 70.6 |
| Total Energy, mw-h | 224 | 247 | 173 |
| Specific Energy, mw-h/g | 113 | 96.7 | 167 |
| Energy Density, mw-h/cm$^3$ | 454 | 502 | 408 |
| Operating Life at 30 $\mu$w, hr | 7,460 | 8,230 | 5,770 |

[1]No. 675E mercury cell
[2]No. 303 silver oxide cell
[3]Na/TCNE cell of comparable packaging at 220° C

TABLE II

| Na-TCNE CELL | |
|---|---|
| CAPACITY (Based on active material): | 380 Coulomb; 106 mA hr ($\pm$5%) |
| OPEN-CIRCUIT VOLTAGE: | |
| Initial | 3.2 V |
| After Half Discharge | 2.1 V |
| LOAD (After half discharge): | 100 k$\Omega$ |
| CURRENT (After half discharge): | 3.0 $\mu$A |
| VOLTAGE (After half discharge): | 0.30 V |
| TOTAL DISCHARGE (50 months): | 397 Coulomb; 110 mA hr |

Figure 3:
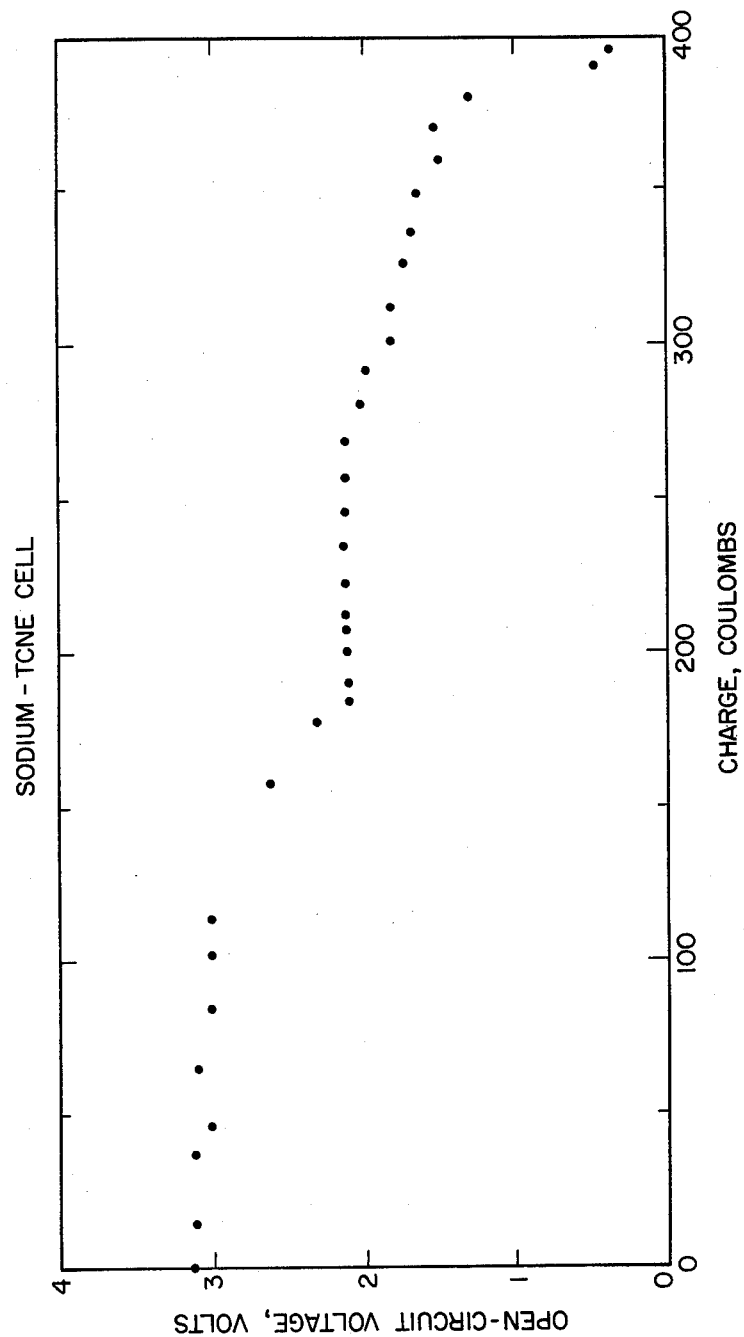
FIG. 3 is a graphical representation of the voltage drop during discharge of a sodium-tetracyanoethylene cell.

Table II shows a fifty-month's performance of the cell in this example. When placed in operation, the cell had an open-circuit voltage of 3.2 volts. At the end of the fifty-month period, during which the load specified in Table II remained constant, the open-circuit voltage was 2.1 volts. FIG. 3 shows a plot of the open circuit voltage drop over a fifty-month discharge.

EXAMPLE II

A cell substantially identical to that of Example I was constructed except that the catholyte consisted of 0.2 mole of sodium hexafluoroarsenate in 10 grams of dimethylsulfoxide. Air was bubbled through this solution. In addition, the platinum gauze was replaced by a gauze of gold-mercury amalgam. The $\beta$-alumina electrolyte has a surface area of 1.54 cm and a thickness of 0.14 cm. The cell was operated in a temperature region of 90° C. Open-circuit voltage of the cell was 2.6 to 2.8 volts and the internal resistance was approximately 350 ohms. The short circuit discharge current was approximately 9 mA and the discharge current across a 350 ohm load was 4.5 mA at 1.3 volts.

We claim:
1. A primary cell comprising an enclosed container having:

A. a solid alkali metal anode;
B. a ceramic electrolyte separator;
C. a liquid cathode;
D. means to conduct electric current to the exterior of said container; and
wherein said anode is in intimate contact with said separator, and said cathode is in intimate contact with the opposite side of said separator.

2. A primary cell according to claim 1 wherein the ceramic electrolyte separator is ionic conductive crystalline sodium aluminate compound.

3. A primary cell according to claim 1 wherein said alkali metal anode is selected from the group consisting of lithium, sodium, and potassium.

4. A primary cell according to claim 1 wherein said cathode is a fluid oxidizer selected from the group consisting of air, oxygen, chlorine, iodine, fluorine, bromine, nitrogen oxides, ozone, tetracyanoethylene, quinones, nitrobenzene, tetracyanoquinodimethan, and phenazinium salts dissolved in an organic solvent with sodium hexafluoroarsenate.

5. A primary cell according to claim 1 wherein said container is made from material selected from the group consisting of glass, plastic, and stainless steel.

6. A primary cell comprising an enclosed container having:

A. a solid alkali metal anodic reactant;
B. a ceramic electrolyte separator;
C. a liquid cathodic reactant;
D. a current collector in juxtaposition with the cathodic reactant and said separator;
E. means to conduct electric current to the exterior of said container; and
wherein said anodic reactant is in intimate contact with said separator.

7. A primary cell according to claim 6 wherein the ceramic electrolyte separator is a crystalline sodium aluminate compound.

8. A primary cell according to claim 6 wherein said anodic reactant is selected from the group consisting of lithium, sodium, and potassium.

9. A primary cell according to claim 6 wherein said liquid cathodic reactant is selected from the group consisting of air, oxygen, chlorine, fluorine, bromine, iodine, ozone, nitrogen oxides, tetracyanoethylene, quinones, nitrobenzene, tetracyanoquinodimethan, and phenazinium salts dissolved in an organic solvent with sodium hexafluoroarsenate.

10. A primary cell according to claim 6 wherein said container is made from material selected from the group consisting of glass, plastic, and stainless steel.

* * * * *